(12) United States Patent
Lee et al.

(10) Patent No.: US 11,228,752 B2
(45) Date of Patent: Jan. 18, 2022

(54) DEVICE AND METHOD FOR DISPLAYING THREE-DIMENSIONAL (3D) IMAGE

(71) Applicant: Samsung Electronics Co., Ltd., Suwon-si (KR)

(72) Inventors: Jinho Lee, Suwon-si (KR); Yang Ho Cho, Seongnam-si (KR); Dong Kyung Nam, Yongin-si (KR); Juyong Park, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1247 days.

(21) Appl. No.: 15/094,119

(22) Filed: Apr. 8, 2016

(65) Prior Publication Data
US 2017/0104983 A1   Apr. 13, 2017

(30) Foreign Application Priority Data
Oct. 7, 2015   (KR) .......................... 10-2015-0140978

(51) Int. Cl.
*H04N 13/305*  (2018.01)
*H04N 13/351*  (2018.01)
*H04N 13/317*  (2018.01)

(52) U.S. Cl.
CPC ......... *H04N 13/305* (2018.05); *H04N 13/317* (2018.05); *H04N 13/351* (2018.05)

(58) Field of Classification Search
CPC .................................................... H04N 13/305
USPC ............................................................ 348/59
See application file for complete search history.

(56) References Cited

U.S. PATENT DOCUMENTS

| | | | |
|---|---|---|---|
| 8,134,590 B2 | 3/2012 | De Zwart et al. | |
| 2013/0286053 A1 | 10/2013 | Fleck et al. | |
| 2014/0300869 A1 | 10/2014 | Hirsch et al. | |
| 2015/0177876 A1* | 6/2015 | Ishii | G06F 3/044 345/174 |
| 2016/0323566 A1* | 11/2016 | Vdovin | G02B 27/2214 |

FOREIGN PATENT DOCUMENTS

| | | |
|---|---|---|
| JP | 2009239665 A | 10/2009 |
| JP | 5289416 B2 | 9/2013 |
| KR | 20140016991 A | 2/2014 |
| KR | 20140056748 A | 5/2014 |
| KR | 20140126308 A | 10/2014 |
| KR | 20150039060 A | 4/2015 |
| WO | WO-2014023321 A1 | 2/2014 |

* cited by examiner

*Primary Examiner* — Yulin Sun
(74) *Attorney, Agent, or Firm* — Harness, Dickey & Pierce, P.L.C.

(57) ABSTRACT

A display device may include a panel including a plurality of pixels and an optical layer. The display device may include a processor configured to generate an image of the panel based on a location relationship between the pixels and the optical elements so that a plurality of rays corresponding to the image propagate evenly at a viewing distance. The location relationship is based on an optical parameter of the optical layer.

20 Claims, 13 Drawing Sheets

FIG. 6

| R | G | B | R | G | B | R | G | B | R | G | B | R | G | B | R | G | B | R | G | B |
|---|---|---|---|---|---|---|---|---|---|---|---|---|---|---|---|---|---|---|---|---|
| 49 | 27 | 6 | 82 | 61 | 39 | 18 | 94 | 73 | 51 | 30 | 9 | 85 | 63 | 42 | 21 | 0 | 75 | 54 | 33 | 12 |
| 63 | 42 | 20 | 93 | 75 | 54 | 32 | 11 | 87 | 66 | 44 | 23 | 2 | 78 | 56 | 35 | 14 | 89 | 68 | 47 | 26 |
| 77 | 56 | 35 | 13 | 89 | 68 | 47 | 25 | 4 | 80 | 58 | 37 | 16 | 92 | 70 | 49 | 28 | 7 | 82 | 61 | 40 |
| 91 | 70 | 49 | 28 | 6 | 82 | 61 | 31 | 18 | 94 | 73 | 51 | 30 | 9 | 85 | 63 | 42 | 21 | 0 | 75 | 54 |
| 9 | 84 | 63 | 42 | 20 | 93 | 75 | 54 | 32 | 11 | 87 | 66 | 44 | 23 | 2 | 78 | 56 | 35 | 14 | 89 | 68 |
| 23 | 1 | 77 | 56 | 35 | 13 | 89 | 68 | 47 | 25 | 4 | 80 | 59 | 37 | 16 | 92 | 70 | 49 | 28 | 7 | 82 |
| 37 | 16 | 91 | 70 | 49 | 27 | 6 | 82 | 61 | 40 | 18 | 94 | 73 | 51 | 30 | 9 | 85 | 63 | 42 | 21 | 0 |
| 51 | 30 | 8 | 84 | 63 | 42 | 21 | 93 | 75 | 54 | 32 | 11 | 87 | 66 | 44 | 23 | 2 | 78 | 56 | 35 | 14 |
| 65 | 44 | 23 | 2 | 77 | 56 | 35 | 13 | 89 | 68 | 47 | 25 | 4 | 80 | 58 | 37 | 16 | 92 | 71 | 49 | 28 |
| 79 | 58 | 37 | 16 | 91 | 70 | 49 | 28 | 6 | 82 | 61 | 39 | 18 | 94 | 73 | 52 | 30 | 9 | 85 | 63 | 42 |

FIG. 7

| Slanted angle | Row number | R | G | B | R | G | B | R | G | B | R | G | B |
|---|---|---|---|---|---|---|---|---|---|---|---|---|---|
| 12.53 degrees | 1 | 20.744 | 41.7896 | 62.8351 | 83.8807 | 8.9263 | 29.9718 | 51.0174 | 72.0629 | 93.1085 | 18.1541 | 39.1996 | 60.2452 |
| | 2 | 15.5436 | 36.5892 | 57.6348 | 78.6803 | 3.7259 | 24.7715 | 45.817 | 66.8626 | 87.9081 | 12.9537 | 33.9993 | 55.0448 |
| | 3 | 10.3433 | 31.3888 | 52.4344 | 73.48 | 94.5255 | 19.5711 | 40.6167 | 61.6622 | 82.7078 | 7.7533 | 28.7989 | 49.8445 |
| 12.54 degrees | 1 | 20.744 | 41.7896 | 62.8351 | 83.8807 | 8.9263 | 29.9718 | 51.0174 | 72.0629 | 93.1085 | 18.1541 | 39.1996 | 60.2452 |
| | 2 | 47.8497 | 68.8952 | 89.9408 | 14.9864 | 36.0319 | 57.0775 | 78.123 | 3.1686 | 24.2142 | 45.2597 | 66.3053 | 87.3508 |
| | 3 | 74.9553 | 96.0009 | 21.0465 | 42.092 | 63.1376 | 84.1831 | 9.2287 | 30.2743 | 51.3198 | 72.3654 | 93.411 | 18.4565 |
| 12.55 degrees | 1 | 20.744 | 41.7896 | 62.8351 | 83.8807 | 8.9263 | 29.9718 | 51.0174 | 72.0629 | 93.1085 | 18.1541 | 39.1996 | 60.2452 |
| | 2 | 80.1508 | 5.1963 | 26.2419 | 47.2874 | 68.333 | 89.3786 | 14.4241 | 34.4697 | 56.5152 | 77.5608 | 2.6064 | 23.6519 |
| | 3 | 43.5575 | 64.6031 | 85.6486 | 10.6942 | 31.7398 | 52.7853 | 73.8309 | 94.8764 | 19.922 | 40.9676 | 62.0131 | 83.0587 | ately, minimized).
DEVICE AND METHOD FOR DISPLAYING THREE-DIMENSIONAL (3D) IMAGE

CROSS-REFERENCE TO RELATED APPLICATION

This application claims priority under 35 U.S.C. § 119 to Korean Patent Application No. 10-0215-0140978, filed on Oct. 7, 2015, at the Korean Intellectual Property Office, the entire contents of which are incorporated herein by reference in its entirety.

BACKGROUND

1. Field

At least one example embodiment relates to a device and/or method for displaying a three-dimensional (3D) image.

2. Description of the Related Art

Many of currently commercialized three-dimensional (3D) display devices employ a principle in which a depth effect is provided by displaying different images to both eyes of a user. However, in such a method, only binocular disparity information may be provided for the user, and monocular depth perception factors, for example, focus adjustment and motion parallax, may not be transmitted. Thus, a 3D image may not be natural and cause eye fatigue.

SUMMARY

At least one example embodiment relates to a display device.

According to an example embodiment, the display device may include a panel including a plurality of pixels, an optical layer configured to generate a light field using a plurality of optical elements, and a processor configured to generate an image of the panel based on a corresponding location relationship between the pixels and the optical elements, wherein an optical parameter of the optical layer is determined to evenly propagate a plurality of rays included in the light field at a viewing distance.

Example embodiments provide that the optical parameter may include a slanted angle between a first line corresponding to the optical elements and a second line corresponding to the pixels, a pitch between the optical elements, an offset location between the panel and the optical layer, a gap between the panel and the optical layer, or a combination selected from the slanted angle, the pitch, the offset location, and the gap.

Example embodiments provide that the slanted angle may be determined based on a number of second pixels corresponding to a direction of a second axis in comparison to a number of first pixels corresponding to a direction of a first axis in the panel, and the direction of the first axis and the direction of the second axis may be orthogonal, and the number of the second pixels may include a number with a decimal when the number of the first pixels is a positive integer.

Example embodiments provide that the pitch may be determined based on a number of third pixels matched to a single optical element, and the number of the third pixels may include a number with a decimal.

Example embodiments provide that the slanted angle may be determined based on a line to connect a point selected at a top of the panel and another point selected at a bottom of the panel, and the slanted angle may be randomly determined within an angle range of which an artifact is reduced (or alternatively, minimized).

Example embodiments provide that the processor may be configured to generate the image based on a direction of a ray according to the corresponding location relationship. For example, the processor may be configured to generate the image based on whether a direction of a ray according to the corresponding location relationship is to be toward a unit viewpoint among a plurality of unit viewpoints divided in a predetermined viewing range. The processor may be configured to determine a viewpoint corresponding to a direction of a ray according to the corresponding location relationship, the viewpoint including a number with a decimal, and generate the image based on a plurality of unit viewpoint images and the viewpoint.

Example embodiments provide that the processor may be configured to obtain a calibration parameter and generate information associated with the corresponding location relationship based on the calibration parameter.

At least one example embodiment relates to a display method.

According to another example embodiment, the display method may include obtaining information associated with a corresponding location relationship between a plurality of pixels included in a panel and a plurality of optical elements included in an optical layer, and generating an image of the panel based on the information associated with the corresponding location relationship.

Example embodiments provide that the optical elements may generate a light field and an optical parameter of the optical layer may be determined to evenly propagate a plurality of rays included in the light field at a viewing distance.

Example embodiments provide that the generating of the image of the panel may include generating the image based on a direction of a ray according to the corresponding location relationship.

Example embodiments provide that the generating of the image of the panel may include determining whether a direction of a ray according to the corresponding location relationship is to be toward a unit viewpoint among a plurality of unit viewpoints divided in a predetermined viewing range and generating the image based on a result of the determining.

Example embodiments provide that the generating of the image of the panel may include determining a viewpoint corresponding to a direction according to the corresponding location relationship, the viewpoint including a number with a decimal, and generating the image based on a plurality of viewpoint images and the viewpoint.

Example embodiments provide that the obtaining of the information associated with the corresponding location relationship may include obtaining a calibration parameter, and generating information associated with the corresponding location relationship based on the calibration parameter.

At least one example embodiment relates to a light field display device.

According to still another example embodiment, the light field display device may include an optical layer configured to control a ray direction of a plurality of subpixels in a single unit type, wherein the optical layer is disposed to evenly propagate rays from the subpixels to different locations at a viewing distance, without the subpixels having a predetermined repetition periodicity with respect to location. The light field display device may generate viewpoint image information based on a direction of a ray according to a viewing location and map the viewpoint image information to the subpixels based on a pattern without predetermined repetition periodicity.

Example embodiments provide that a slanted angle of the optical layer and a pitch of a unit may be adjusted regardless of a number of input viewpoint images. The viewpoint image information on the subpixels corresponding to each of the pixels at the viewing location may be mapped differently. Subpixel mapping information may be changed using a calibration parameter.

Example embodiments provide that a plurality of optical layer units may be configured as a single unit block. In this example, the viewpoint image information on the subpixels corresponding to each of the pixels at the viewing location may be mapped based on a predetermined repetition pattern.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 6 illustrates an example of viewpoint image information mapping according to at least one example embodiment;

FIG. 7 illustrates another example of viewpoint image information mapping according to at least one example embodiment;

DETAILED DESCRIPTION

Figure 1:
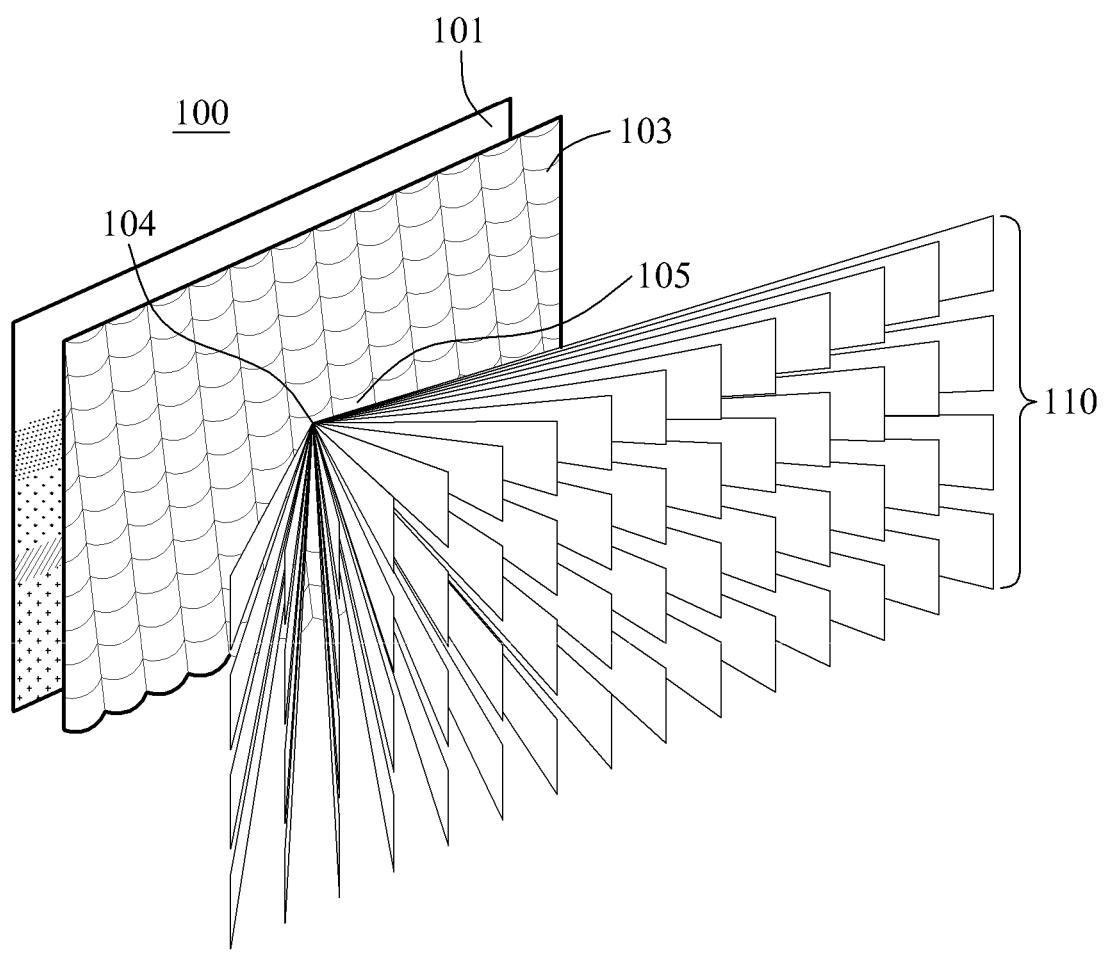
FIG. 1 illustrates an example of a light field display device according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

Example embodiments to be described hereinafter may be provided in various forms of products including, for example, a personal computer (PC), a laptop computer, a tablet PC, a smartphone, a television (TV), a smart home appliance, an intelligent vehicle, a kiosk, and a wearable device.

FIG. 1 illustrates an example of a light field display device according to at least one example embodiment. Referring to FIG. 1, a configuration of a light field display device 100 is described.

The light field display device 100 may represent light output from points in a desired (or alternatively, predetermined) space to various directions. The light field display device 100 may use a principle in which an actual object generates or reflects light from a single point to various directions. The light field display device 100 may render an image of a panel 101. Here, rendering may refer to an operation of generating an image to be displayed in the panel 101 for generating a light field in a three-dimensional (3D) space. For example, the rendering may refer to an operation of determining a value of a pixel included in the panel 101 for generating the light field in the 3D space. Hereinafter, for ease of description, example embodiments are described as operating based on a pixel. However, example embodiments may also operate based on a subpixel of a pixel. In this case, references to the pixel may be understood as references to the subpixel.

Figure 12:
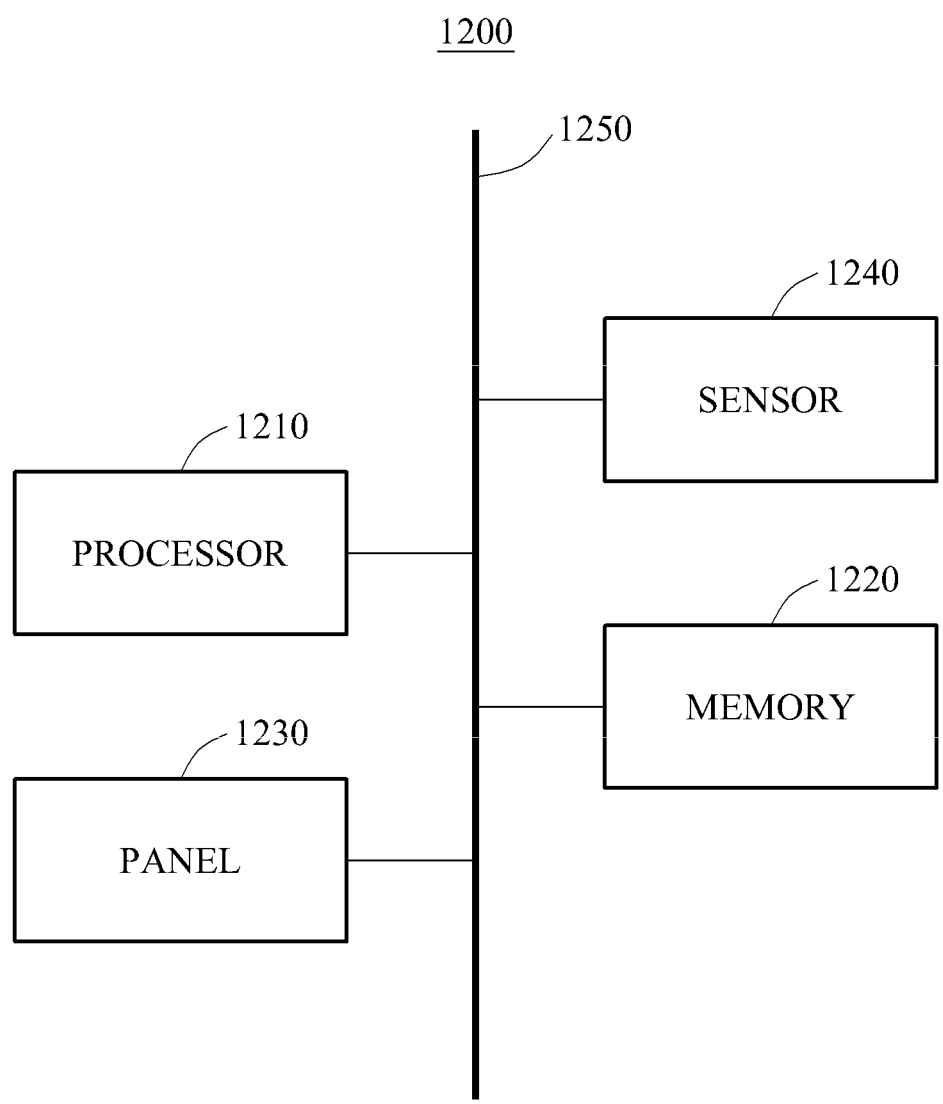
FIG. 12 is a block diagram illustrating an example of an electronic system according to at least one example embodiment.

Although not illustrated, a rendering operation may be driven by a processor included in the light field display device 100 (e.g., processor 1210 in FIG. 12). Here, the processor may be implemented by a hardware module, a software module or a combination thereof.

The light field display device 100 includes the panel 101 and an optical layer 103. The panel 101 includes a liquid crystal display (LCD), such as a pixel-based display. A structure of pixels included in the panel 101 may be variously changed. For example, the panel 101 may be a red, green, and blue (RGB) panel in which pixels are arranged in a striped pattern or a PenTile™ panel in which pixels are arranged in a diamond pattern.

For example, the light field display device 100 may provide rays in different directions based on the PenTile™ panel. A general RGB panel has a pixel structure in which an R (red) subpixel, a G (green) subpixel, and a B (blue) subpixel having identical sizes are included in a single pixel. Conversely, sizes of an R subpixel, a G subpixel, and a B subpixel included in the PenTile™ panel may be different. The G subpixel and the R subpixel may be diagonally arranged in a single pixel. Also, the G subpixel and the B subpixel may be diagonally arranged in a single pixel. An arrangement of subpixels in a single pixel may be variously changed. Each size and form of the R subpixel, the G subpixel, and the B subpixel may be variously changed.

An optical layer 103 may include an optical filter, for example, a lenticular lens, a parallax barrier, a lens array, and/or a micro lens array. The lenticular lens may be disposed on a front surface or a rear surface of a panel. The parallax barrier may be disposed on a front surface or a rear surface of a pixel-type display to play an identical role as the lenticular lens. When the parallax barrier is disposed on a rear surface of the pixel-type display, the parallax barrier may be disposed between the pixel-type display and a backlight unit. The optical layer 103 is not limited to the aforementioned optical filters. The optical layer 103 may include other types of optical layers that may be disposed on a front surface or a rear surface of a display.

A direction of a ray output from a pixel included in the panel 101 may be determined by the optical layer 103. Light output from each pixel may pass through the optical layer 103 (for example, a microlens in the optical layer) and be radiated in a desired (or alternatively, predetermined) direction. Based on such a process, the light field display device 100 may represent a stereoscopic image or a multiview image. An optical feature of the light field display device 100 may include a feature associated with a direction of a ray of a pixel included in the panel 101.

The optical layer 103 includes a plurality of optical layers (or optical elements) 104 and 105. Each of the optical layers may be referred to as a 3D picture element. A single 3D picture element may output a ray including other information to various directions. For example, rays 110 in a 15×4 configuration may be output from a single 3D picture element included in the optical layer 103. The light field display device 100 may represent points in a 3D space using a plurality of 3D picture elements.

An optical parameter of the optical layer 103 is determined so that rays output through the panel 101 propagate evenly to the 3D space. The optical parameter of the optical layer 103 includes a slanted angle, a pitch, an offset location, and/or a gap between the panel 101 and the optical layer 103. Detailed descriptions of how a parameter of an optical layer may be determined will be provided.

Hereinafter, a method of providing a 3D image using the light field display device 100 will be described. As will be described in detail later, example embodiments may provide technology for implementing a consistent 3D image without limiting a viewing location by evenly forming rays and directing those rays to a 3D space. Example embodiments may be applicable to various display devices, for example, a television (TV), a digital information display (DID), a monitor, and/or a mobile device.

To effectively provide a 3D image including a 3D effect, each of images having different viewpoints may be represented by a left viewpoint and a right viewpoint of a user. To provide the 3D image for a user without 3D glasses, the 3D image may be represented to be spatially divided based on a viewpoint. The foregoing method is referred to as a glassless 3D display method.

A glassless 3D display device may represent an image by dividing the image in a space using an optical layer. The optical layer may control a direction of a ray such that a ray output through each pixel included in a panel is to be propagated in a desired (or alternatively predetermined) direction. For example, a lenticular lens may control a direction of a ray propagated to a 3D space according to how light is refracted when the light passes through a lens, and a parallax barrier may control the direction of the ray propagated to the 3D space by selectively passing through light using a slit.

The light field display device 100 may generate a 3D image based on the glassless 3D display method. In this example, a light field may be a field that represents an intensity of light substantially propagated in all directions at a point in a 3D space. The light field may be suitable for representing an actual object in the 3D space. The light field display device 100 may provide a 3D image similar to an actual object by representing a light field in an actual space.

Figure 2A:
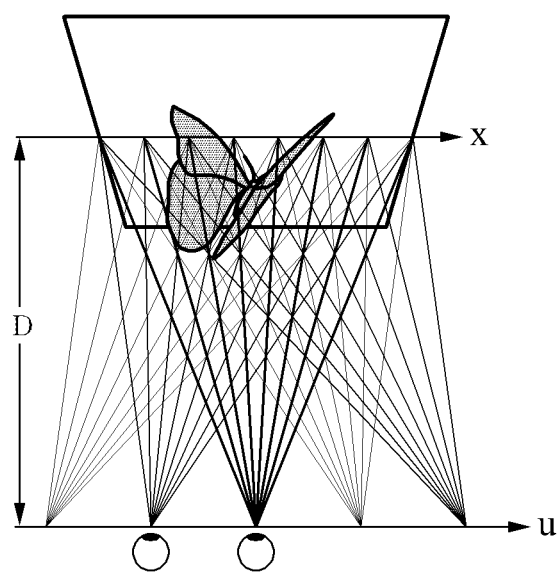
FIGS. 2A through 2D illustrate examples of a ray distribution output by a light field display device according to at least one example embodiment.
Figure 2B:
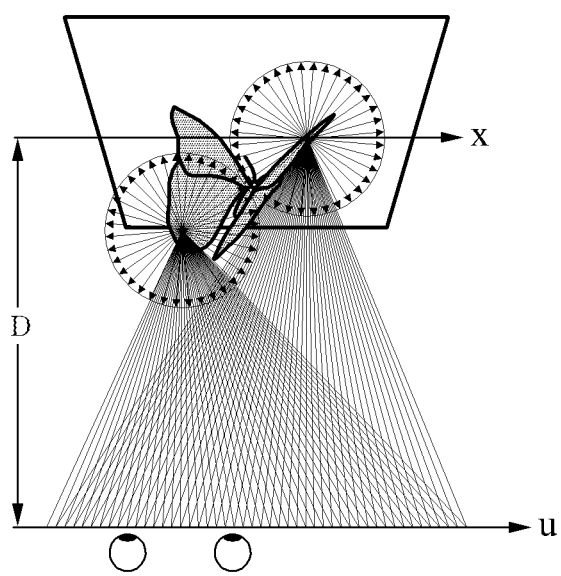
Figure 2C:
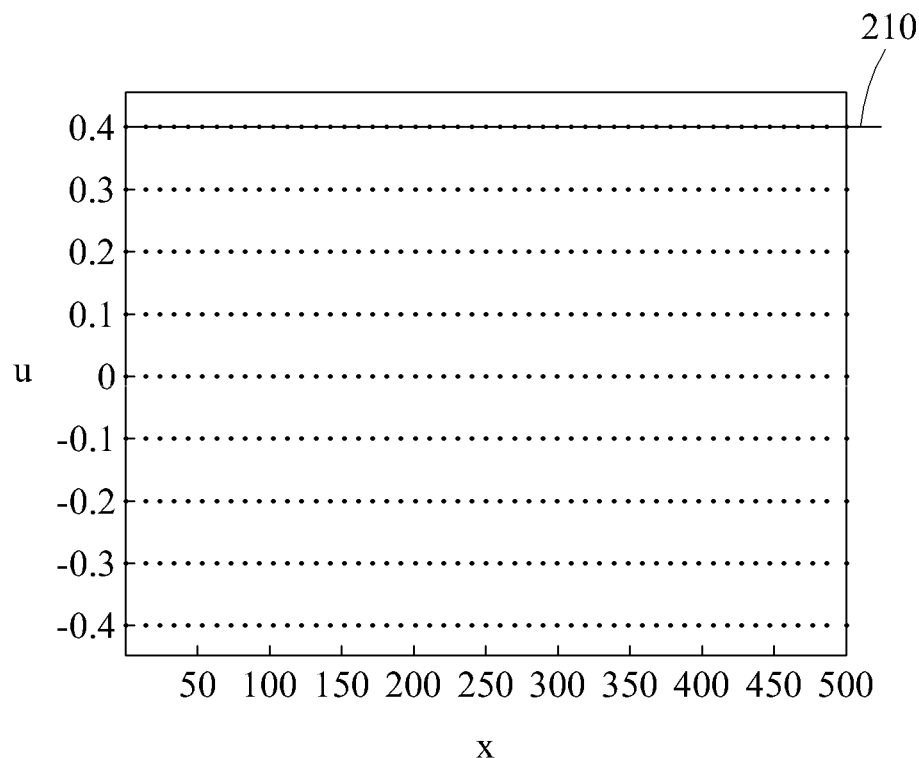

FIGS. 2A through 2D illustrate examples of a ray distribution output by a light field display device according to at least one example embodiment. Referring to FIGS. 2A and 2C, a ray distribution output by a general (or conventional) multi-view display device will be described, and then referring to FIGS. 2B and 2D, a ray distribution according to at least one example embodiment will be described.

FIG. 2A illustrates an example of a direction of which rays output from a plurality of pixels included in a panel are propagated to a 3D space when a general multi-view display method is used to provide a glassless 3D display method. An optical layer in the multi-view display method may be designed to allow rays output through a panel to be concentrated at a viewing distance having a desired (or alternatively, predetermined) pitch.

FIG. 2C is a ray distribution diagram for the multi-view display method. Referring to FIG. 2C, a ray output from "x" and toward "u" is expressed as one point. Here, the "x" indicates a horizontal direction coordinate in a panel, and the "u" indicates a horizontal direction coordinate at a viewing distance "D." A horizontal axis of the ray distribution diagram corresponds to the "x" coordinate, and a vertical axis of the ray distribution diagram corresponds to the "u" coordinate.

In FIG. 2C, the multi-view display method may provide nine viewpoints. In this example, points included in the ray distribution diagram may be distributed on nine straight lines. Each of the nine straight lines may have different "u" points. Based on the multi-view display method, a plurality of rays may be concentrated at a viewing location corresponding to each of the nine straight lines. For example, the plurality of rays may be concentrated at a viewing location 210 of which the "u" is 0.4. As a number of viewpoints provided based on the multi-view display method increases, a number of straight lines included in the ray distribution diagram increases while the straight lines remain horizontal.

Based on the multi-view display method, an optimal viewing location, for example, a sweet spot, at which a 3D image is clearly displayed, exists, but an image may not be seen clearly or a brightness of the image may decrease at another location. For example, a 3D image is clearly displayed at an optimal viewing location, a sweet spot, but may be displayed less clearly or less brightly at another viewing location.

Example embodiments may reduce the limits of a viewing location by adjusting a pitch and a slanted angle of the optical layer to enhance inconsistency in a brightness distribution. Example embodiments may provide a 3D image without limiting a viewpoint location by forming a light field to evenly distribute a plurality of rays in a 3D space.

FIG. 2B illustrates an example of a direction of which rays output from a plurality of pixels included in a panel are propagated to a 3D space when a light field display method according to at least one example embodiment is used. An optical layer in the light field display method may be designed to evenly distribute rays output through a panel at a viewing distance. In this example, the rays may be evenly distributed and propagated to viewing locations.

Figure 2D:
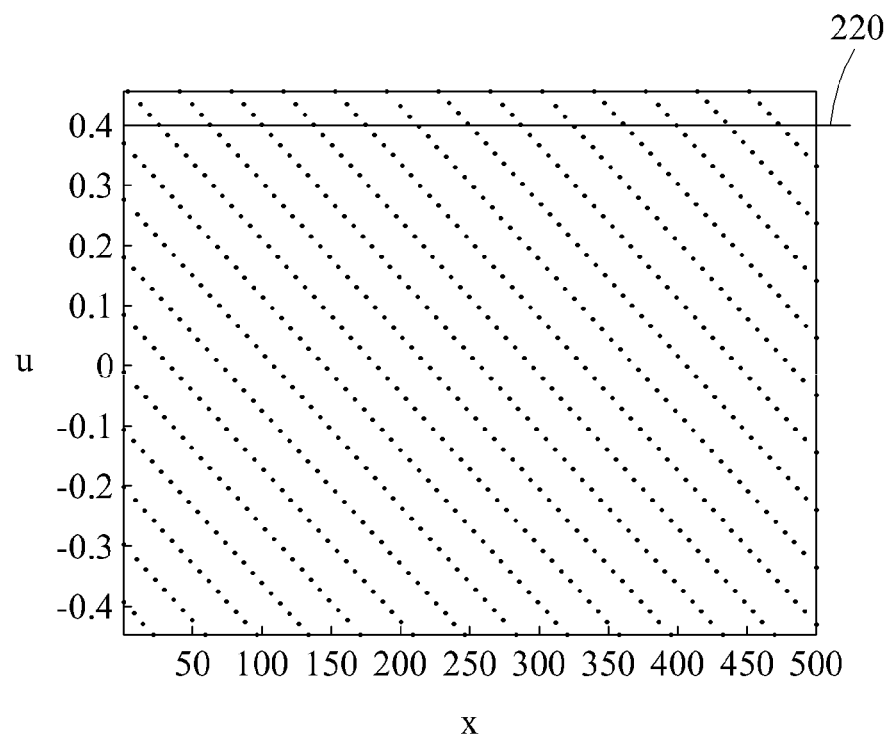

FIG. 2D is a ray distribution diagram for the light field display method. Referring to FIG. 2D, points on the ray distribution diagram are not positioned on a horizontal line. In an example, when a ray distribution of FIG. 2D is compared to a ray distribution of FIG. 2C based on a viewing point 220 where "u" is 0.4, the plurality of rays may be evenly distributed at various viewing locations instead of reaching a desired (or alternatively, predetermined) viewing location when the light field display method is used. Thus, the light field display method may provide a consistent 3D image without limitation of a viewing location. In an example, the light field display method may provide 96 viewpoints.

The light field display method may not require a desired (or alternatively, predetermined) limiting condition to provide the consistent 3D image. As will be described later, the optical layer in the light field display method may be designed to evenly distribute a plurality of rays at various viewing locations in the 3D space. Further, the light field display apparatus 100 may provide the consistent 3D image by mapping, to each pixel, viewpoint images corresponding to a direction of a ray toward a viewing location based on a pattern that does not have a desired (or alternatively, predetermined) repetition periodicity.

Figure 3:
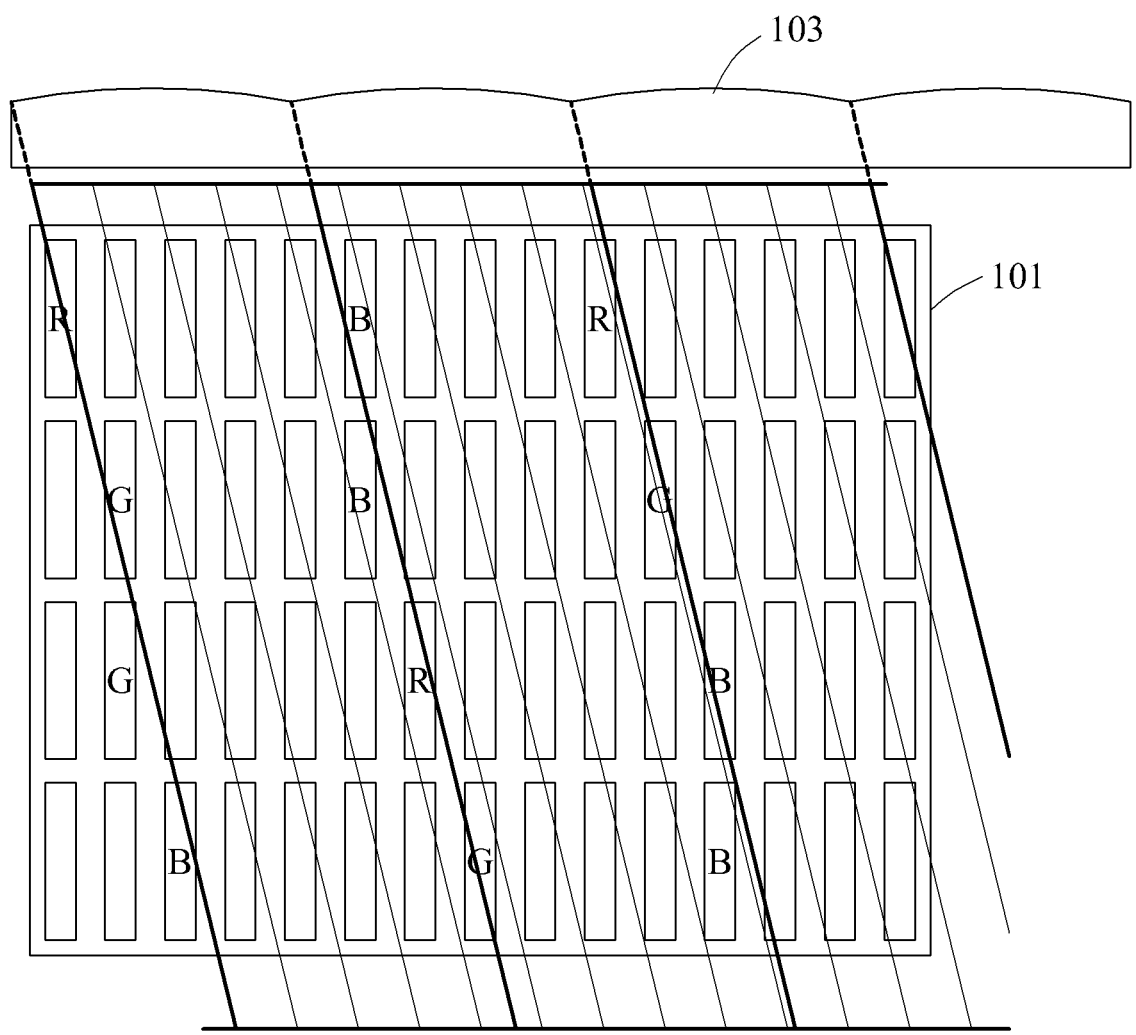
FIG. 3 illustrates an example of a method of designing an optical layer according to at least one example embodiment.

FIG. 3 illustrates an example of a method of designing the optical layer 103 according to at least one example embodiment. Referring to FIG. 3, a parameter of the optical layer 103 includes a slanted angle, a pitch, an offset location, a gap between the panel 101 and the optical layer 103, or various combinations thereof. In an example, the optical layer 103 may be disposed at a front surface or a rear surface of the panel 101 including a plurality of pixels based on the slanted angle, the pitch, the offset location, and/or the gap.

The optical layer 103 includes a plurality of optical elements. Each of the optical elements included in the optical layer 103 may be matched to a number of pixels with respect to one row in a matrix. One optical element may be expressed as one unit. For example, an optical element may include a lenticular lens unit.

The pitch of the optical parameter may be expressed in a number of pixels matched to a single unit. The single unit may be matched to a plurality of pixels included in the panel 101. For example, in a structure in which the optical elements are arranged on the plurality of pixels, pixels overlapping an optical element may be matched to the optical element.

An entire pixel area of the pixels matched to the optical element may overlap the optical element, or a portion of the pixel area may overlap the optical element. In this example, a number of pixels corresponding to a single optical element may have a number with a decimal, for example, number.x. The number with a decimal corresponds to a number that is not a whole number, but a fractional number expressed in decimal form, for example, 4.75 or 5.75, etc.

When the plurality of pixels included in the panel 101 are arranged in a matrix form, one optical element may be matched to pixels of a plurality of rows. In this example, one optical element may be divided to correspond to each row and each optical element may be used for each row.

The slanted angle may be referred to as a slanted angle of an axis of an optical element compared to a column direction of a matrix in the panel 101. For example, the slanted angle may be expressed as a pixel distance shifted toward a second direction, for example, a right direction, for each single pixel distance toward a first direction, for example, a downward direction, of the matrix in the panel 101.

The offset location may be referred to as a relative location relationship between a reference point of the panel 101 and a reference point of the optical layer 103. In an example, a parameter of the optical layer 103 may be adjusted to evenly distribute rays output from the pixels of the panel 101 in a viewing area corresponding to a viewing location, without the rays overlapping each other. Thus, the optical parameter of the optical layer 103 may be adjusted. For example, the optical layer 103 may be arranged to not have a desired (or alternatively, predetermined) repetition periodicity compared to an arrangement of the pixels in the panel 101.

The slanted angle and/or the pitch may be determined to include a number with a decimal. For example, an optical element in FIG. 3 may have a pitch corresponding to approximately 4.5 pixels and have a slanted angle corresponding to approximately 0.25 pixel shifts. The pitch may be adjusted regardless of a number of input viewpoint images. The offset location of the optical layer 103 disposed on the panel 101 may be adjusted.

In an example, the slanted angle is determined based on a number of second pixels corresponding to a direction of a second axis in comparison to a number of first pixels corresponding to a direction of a first axis in the panel 101. In this example, the directions of the first axis and the second axis may be orthogonal. The number of the second pixels includes a number with a decimal when the number of the first pixels is a positive integer. In this example, the number of the second pixels may be greater than the number of the first pixels.

Thus, example embodiments may be variously changed and designed. Example embodiments may be applied to a design that enhances color uniformity or a design that reduces (or alternatively, prevents) artifacts, for example, a moiré pattern, from appearing in an image. Therefore, example embodiments may be used to obtain a high quality image when a 3D image is provided. Also, a viewer may view a consistent 3D image without a deviation at any location within a viewing angle range of the light field display device 100.

A configuration and a feature according to example embodiments may be expressed as shown in Table 1.

TABLE 1

Configuration

An optical layer may be arranged without a desired (or alternatively, predetermined) repetition periodicity with respect to a pixel location, (by adjusting an optical parameter, for example, a slanted angle, a pitch, an offset location, and/or a gap)
A slanted angle may be set as an angle, for example, a pixel shift of 0.XXX, including a number with a decimal.
A number of pixels matched to a single lens unit may be set as a number, for example, a pixel portion area of 4.XXX, including a number with a decimal.

Feature

A pixel location may be without repetition periodicity or regularity.

Figure 4:
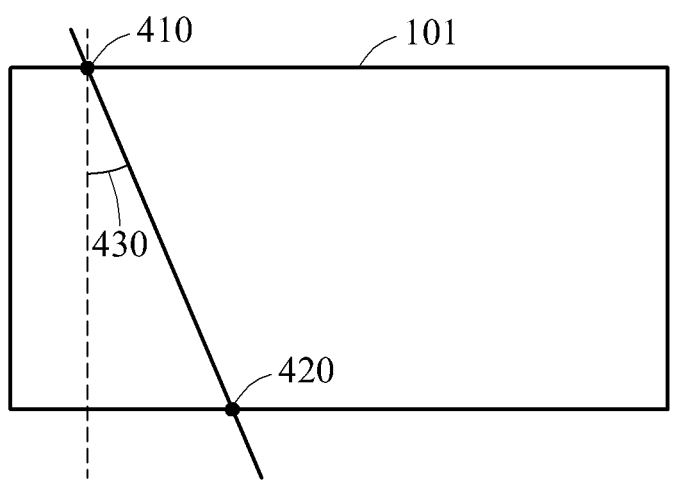
FIG. 4 illustrates an example of a method of determining a slanted angle according to at least one example embodiment.

FIG. 4 illustrates an example of a method of determining a slanted angle according to at least one example embodiment. Referring to FIG. 4, the optical layer 103 may be disposed regardless of a relative location relationship with a plurality of pixels included in the panel 101. For example, a slanted angle 430 may be determined based on a top 410 and a bottom 420 of the panel 101. Alternatively, the slanted angle 430 may be randomly selected within an angle range in which an artifact of an image is reduced (or alternatively, minimized). The angle range may be a design parameter that is user defined and/or selected based on empirical evidence. In this example, optical elements included in the optical layer 103 and pixels included in the panel 101 may be without repetition periodicity or regularity. The slanted angle 430 may be determined during or before a process of attaching the optical layer 103 to a top of the panel 101.

The light field display device 100 may recognize a corresponding location relationship between the pixels in the panel 101 and the optical elements in the optical layer 103 based on a calibration process. The light field display device 100 may generate an image of the panel 101 based on a pixel mapping method determined by the calibration process. The pixel mapping method will be described with reference to FIG. 5.

Figure 5:
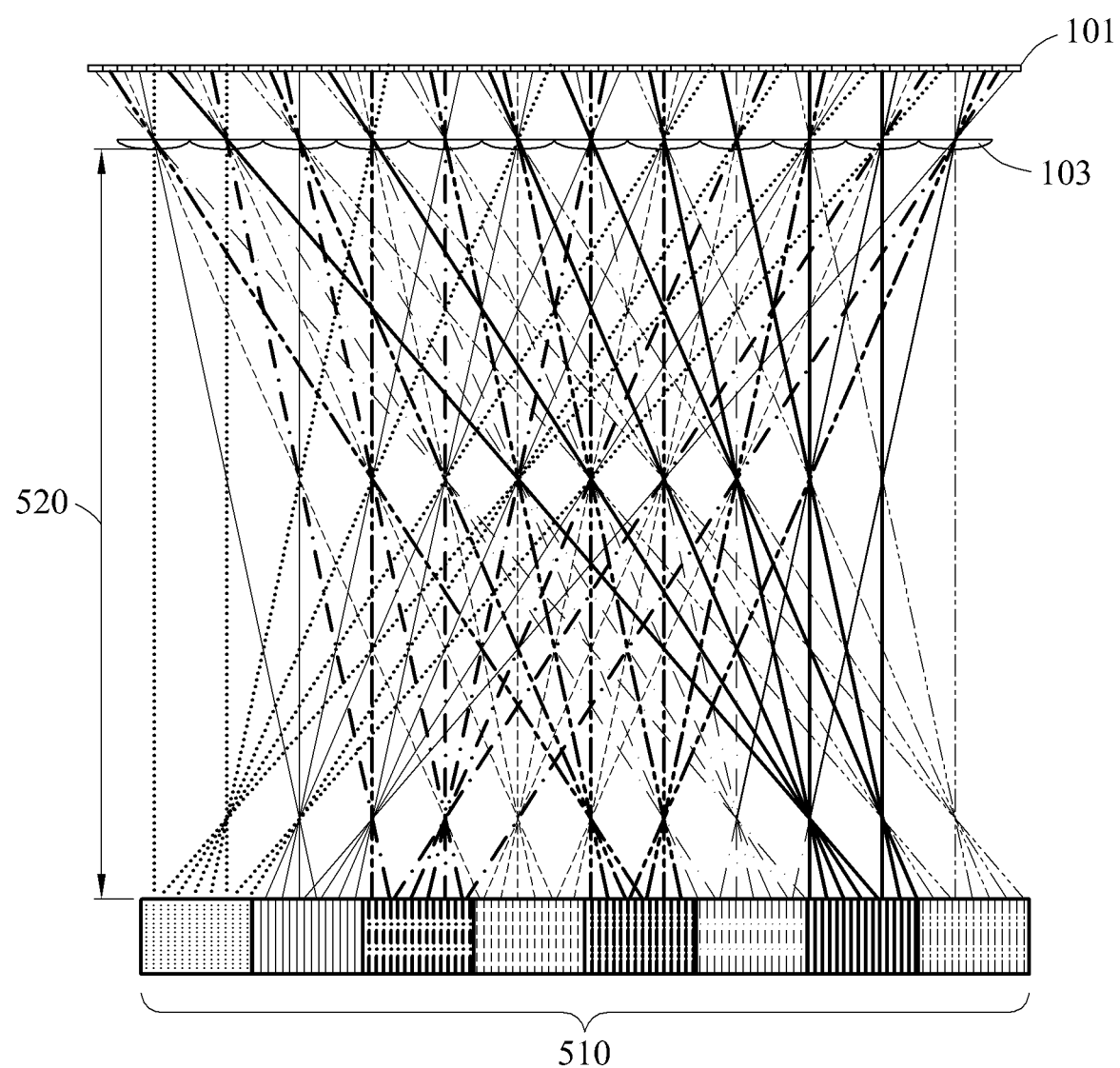
FIG. 5 illustrates an example of a pixel mapping method according to at least one example embodiment.

FIG. 5 illustrates an example of a pixel mapping method according to at least one example embodiment. Referring to FIG. 5, the light field display device 100 may map viewpoint image information corresponding to a viewing location to each pixel corresponding to a direction of a ray toward the viewing location.

As described above, the optical layer 103 may be disposed on a front surface of a pixel type display. In such an example, the light field display device 100 may calculate a direction of a ray propagated by passing through each optical element from each pixel. For example, rays output from any one pixel may be substantially propagated to all directions. Directions of which the rays output from the pixel are propagated to a 3D space may be determined by passing the rays through different lenses. The direction of rays output from the pixel after passing through the different lenses may be different based on a pitch of the optical layer 103.

The light field display device 100 may select, from among directions of different rays, a direction of a ray toward a location closest to a center of a viewing area 510 of a desired (or alternatively, optimal) viewing distance 520. The viewing area 510 of the desired (or alternatively, optimal) viewing distance 520 may be a surface parallel to the panel 101, the optical layer 103 or a combination thereof.

The viewing area 510 of the desired (or alternatively, optimal) viewing distance 520 may be divided into a plurality of viewing areas. The plurality of viewing areas may have a desired (or alternatively, predetermined) pitch. The light field display device 100 may determine an image of the panel 101 based on the plurality of viewing areas. For example, the light field display device 100 may determine whether a direction of a ray selected to correspond to a desired (or alternatively, predetermined) pixel is toward a viewing area from among the plurality of viewing areas, and may map image information of the corresponding viewing area to the desired (or alternatively, predetermined) pixel. The light field display device 100 may map the image information with respect to all pixels. In an example, the light field display device 100 may generate a mapping table to store mapping information of each pixel based on the optical viewing distance 520 and a number of viewing images to be applied. The mapping table may be stored in a memory of the light field display device 100.

FIG. 6 illustrates an example of viewpoint image information mapping according to at least one example embodiment. Referring to FIG. 6, the light field display device 100 may generate viewpoint image mapping information based on a direction of a ray of each pixel. In an example, a parameter of an optical layer may be determined to evenly propagate rays output from a panel in a 3D space. Thus, pixels and the viewpoint images may be mapped based on a random pattern without a desired (or alternatively, predetermined) repetition periodicity.

For example, a table of FIG. 6 illustrates an example of forming a light field based on a total of 96 pieces of viewpoint image information. Referring to FIG. 6, the 96 pieces of viewpoint image information included in the light field may be mapped to each pixel of the panel based on the random pattern. Based on the aforementioned descriptions in FIG. 5, image information of a corresponding viewpoint area may be mapped to a pixel of a ray having a direction toward each viewpoint area, thereby generating the table of FIG. 6. A result of the mapping does not have repetition periodicity with respect to location of a pixel. Such a mapping method may be referred to as random pattern mapping.

In a process of aligning and assembling the panel and the optical layer of the light field display device 100, various calibration processes may be required. In this example, the light field display device 100 may generate the viewpoint image mapping information using a parameter changed by a calibration process. For example, the light field display device 100 may effectively generate the viewpoint image mapping information by applying the aforementioned pixel mapping method based on the changed parameter. Through this, example embodiments may easily correct an error occurring due to a process and an assembly of the light field display device 100 without quality deteriorating.

FIG. 7 illustrates another example of viewpoint image information mapping according to at least one example embodiment. Referring to FIG. 7, the light field display device 100 may generate a center viewpoint image in a decimal viewpoint form in lieu of selecting one of a plurality of viewpoint images to determine a viewpoint image corresponding to a direction of a ray. The light field display device 100 may generate the center viewpoint image in the decimal viewpoint form by optimizing the plurality of viewpoint images to be applied. In an example, the light field display device 100 may perform interpolation on at least two neighboring viewpoint images and generate the center viewpoint image between the two neighboring viewpoint images.

A table of FIG. 7 illustrates an example in which a result of the viewpoint image mapping is changed in response to a slanted angle being changed. The viewpoint image mapped to each pixel may be the center viewpoint image generated based on a direction of a ray reaching to a viewing area of a desired (or alternatively, optimal) viewing distance. In an example, a first row of image mapping results may not change in response to a slanted angle being changed from 12.53 degrees by 0.01 degrees to 12.54 degrees, but starting from a second row image mapping results may be largely changed. Thus, example embodiments may provide a consistent 3D image without limiting a viewing location, and generate and use theoretically infinite viewpoint information.

Figure 8:
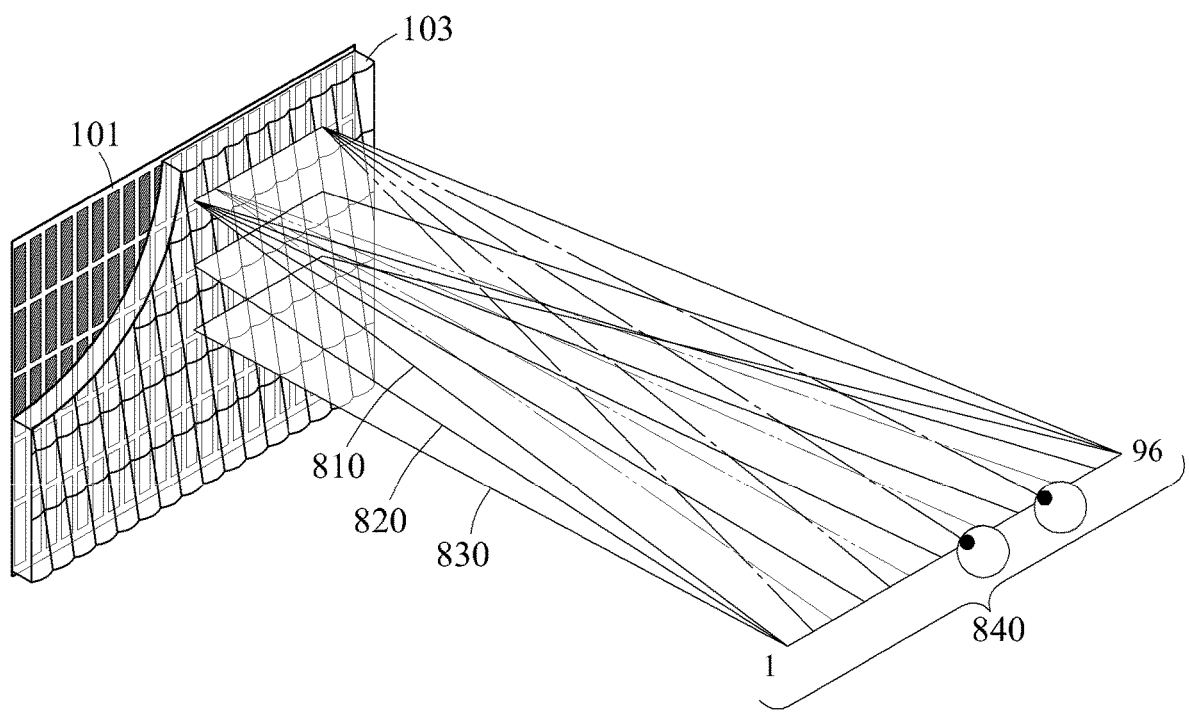
FIGS. 8 and 9 illustrate examples of a method of providing a light field according to at least one example embodiment.
Figure 9:
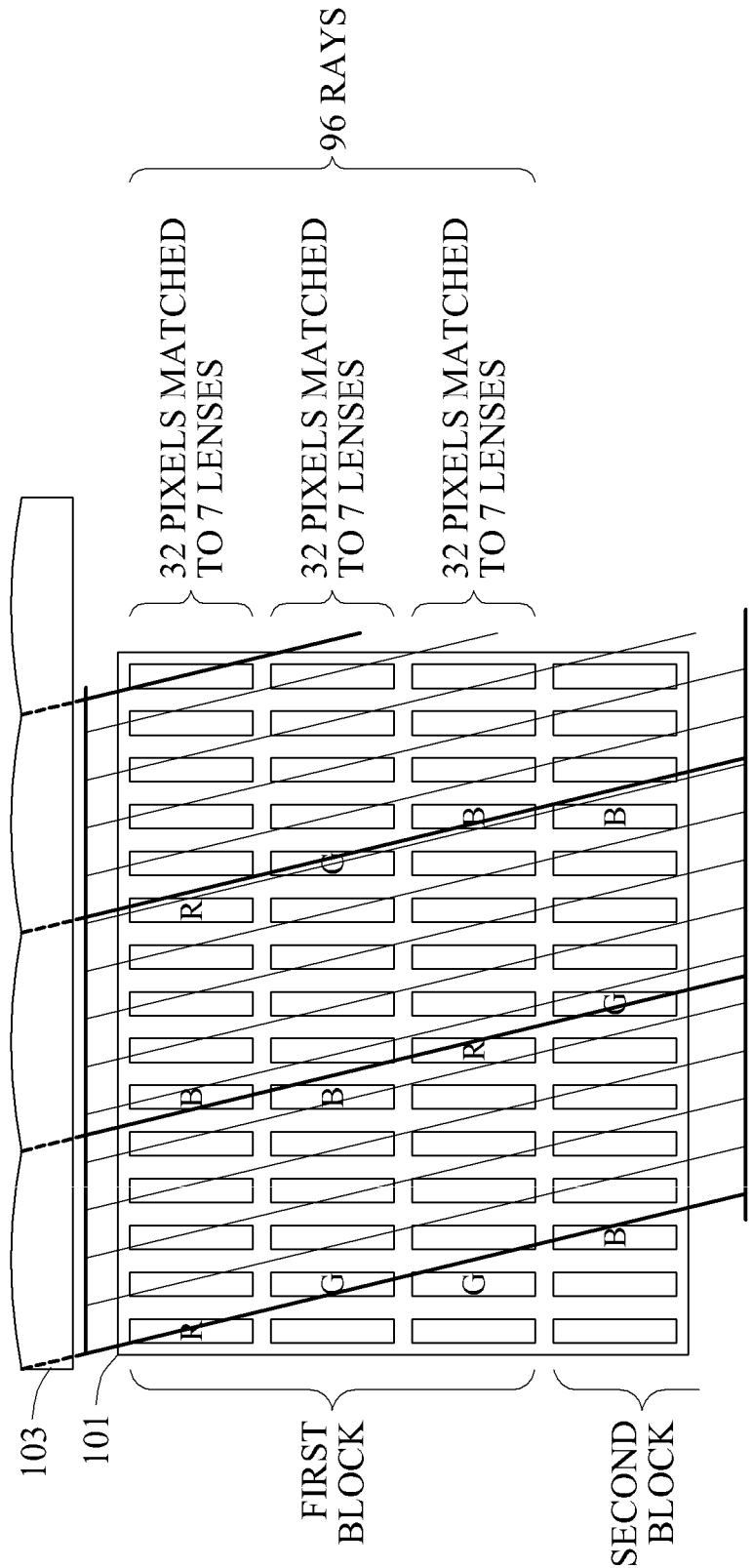

FIGS. 8 and 9 illustrate examples of a method of a light field according to at least one example embodiment.

Referring to FIG. 8, a plurality of viewpoint images included in a light field may be provided using a plurality of rows in a matrix including pixels of the panel 101. For example, 96 viewpoint images 840 may be provided using total three rows 810, 820, and 830, and 32 pixels are included for each of the rows 810, 820, and 830. A number of rows and columns of an optical layer configuring the light field may be variously changed, and a number of pixels matched to an optical element may be variously changed.

Referring to FIG. 9, a single unit block, for example, a first block and a second block, may be provided using a plurality of optical elements in an optical layer. As described above, one optical element may be matched to a plurality of pixels for each row of a matrix of the panel 101. In an example, one optical element may be matched to 4.57 pixels in one row. In this example, seven optical elements may be matched to total 32 pixels in one row.

One unit block may be provided using 21 optical elements corresponding to three rows. The light field display device 100 may form a light field by mapping total 96 pieces of viewpoint image information to 96 pixels matched to 21 optical elements corresponding to three rows. As described above, a method of mapping, to each pixel, the viewpoint image information corresponding to a direction of a ray at a viewing distance may be used. Referring to FIGS. 8 and 9, the repetition pattern mapping may be applicable based on the unit block.

A slanted angle of the optical layer 103 may be a degree corresponding to a movement of 0.25 pixels toward a second direction, for example, a right direction, when one pixel moves toward a first direction, for example, a downward direction. In this example, the slanted angle does not have repetition periodicity with respect to pixel location.

Figure 10:
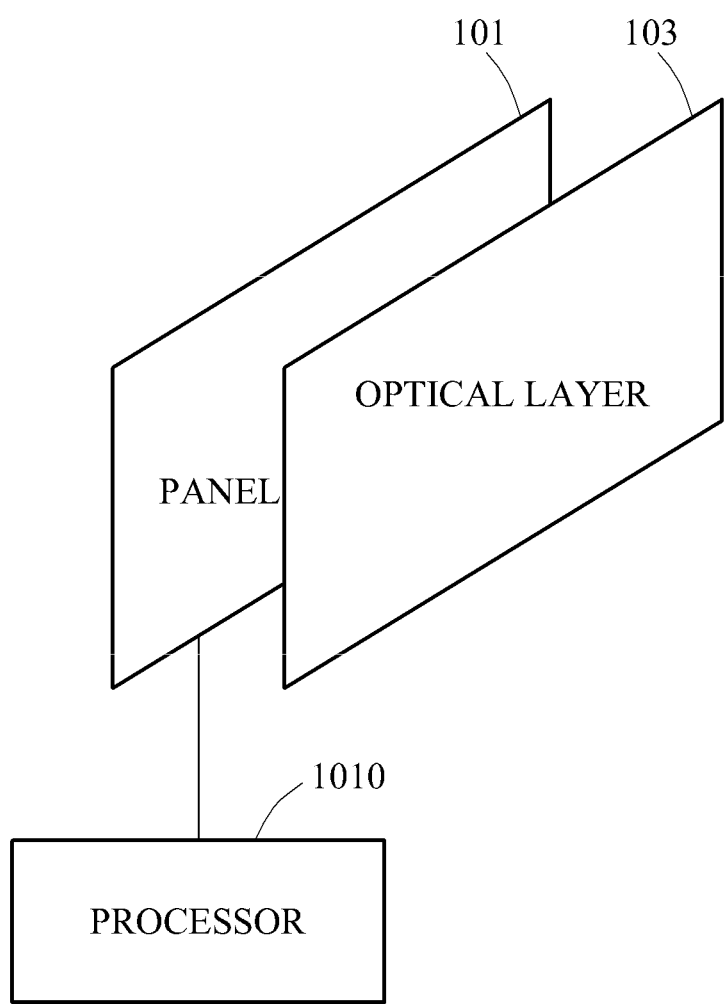
FIG. 10 is a block diagram illustrating an example of a display device according to at least one example embodiment.

FIG. 10 is a block diagram illustrating an example of a display device according to at least one example embodiment. Referring to FIG. 10, a display device 1000 includes the panel 101, the optical layer 103, and a processor 1010 (e.g., a special purpose processor executing instructions stored on a memory). The panel 101 includes a plurality of pixels and the optical layer 103 includes a plurality of optical elements. The optical layer 103 generates a light field using the plurality of optical elements.

The processor 1010 generates an image of the panel 101 based on a corresponding location relationship between the pixels and the optical elements. An optical parameter of the optical layer 103 may be determined to evenly propagate a plurality of rays included in the light field in a 3D space, for example, at various viewing locations.

Figure 11:
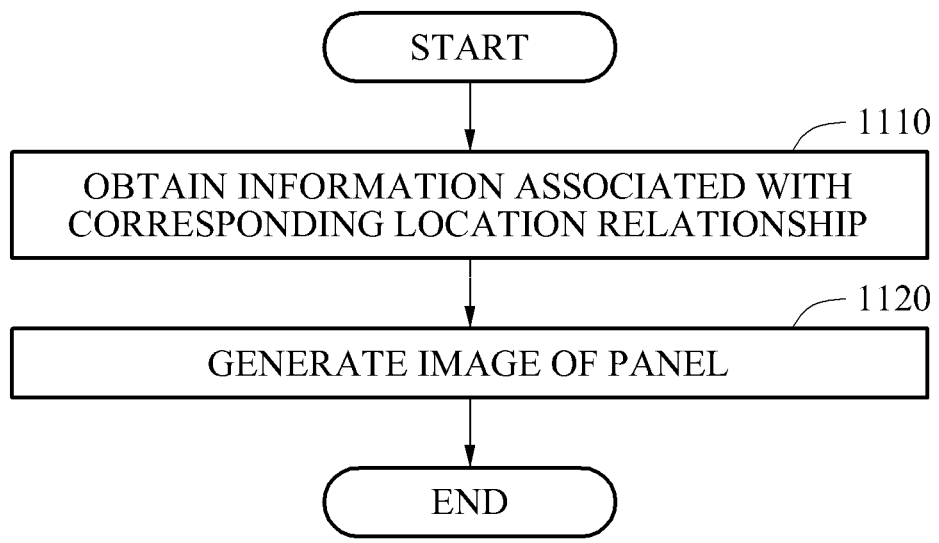
FIG. 11 is a flowchart illustrating an example of a display method according to at least one example embodiment.

FIG. 11 is a flowchart illustrating an example of a display method according to at least one example embodiment. Referring to FIG. 11, a display method includes operation 1110 of obtaining information associated with a corresponding location relationship and operation 1120 of generating an image of a panel. In operation 1110, the information associated with the corresponding location relationship between a plurality of pixels included in the panel and a plurality of optical layers included in an optical layer are obtained. The information may be based on a calibration parameter. In operation 1120, the image of the panel is generated based on the information associated with the corresponding location relationship.

FIG. 12 is a block diagram illustrating an example of an electronic system according to at least one example embodiment. Referring to FIG. 12, an electronic system 1200 includes a processor 1210, a memory 1220, a panel 1230, and a sensor 1240. The processor 1210, the memory 1220, the panel 1230, and the sensor 1240 may communicate with each other through a bus 1250.

The processor 1210 may be a special purpose processor that executes a program (or computer readable instructions) stored in a memory and controls the electronic system 1200. The processor 1210 performs at least one of the aforementioned methods illustrated in FIGS. 1 through 11. The panel 1230 corresponds to the panel 101 in FIG. 1. The processor 1210 generates an image of the panel 1230 to provide a 3D image without limiting a viewing location. A program code (or computer readable instructions) executed by the processor 1210 may be stored in the memory 1220. The memory 1220 may be a volatile memory or a non-volatile memory.

An optical layer may be attached to a front surface or a rear surface of the panel 1230. The processor 1210 generates the image of the panel 1230 based on a parameter of the optical layer.

The panel 1230 displays the image generated by the processor 1210.

The sensor 1240 may be an image sensor, for example, a camera. The sensor 1240 captures an image based on a well-known method, for example, a method of converting an optical image to an electrical signal. The image is output to the processor 1210. In an example, the processor 1210 tracks a location of a viewer based on the image. In this example, the processor 1210 generates the image of the panel 1230 based on the location of the viewer.

An electronic system may be connected to an external device, for example, a personal computer (PC) or a network, through an input and output device (not shown) and may exchange data. The electronic system may include various electronic systems, such as a mobile device, for example, a cellular phone, a smartphone, a personal digital assistance (PDA), a tablet computer, a laptop computer, a computing device, for example, a PC, a tablet computer, a netbook, or an electronic product, for example, a television (TV), a smart TV, a security device for a gate control.

Example embodiments may provide a consistent 3D image without limitation of a viewing location by evenly forming numerous rays at a viewing location. In addition, example embodiments may apply numerous pieces of center viewpoint information optimized for directions of each ray configuring a light field. Also, since an optical layer is variously changed and designed, example embodiments may be easily used for a design that prevents artifacts, for example, a moiré pattern, such that quality, for example, improvement of color uniformity, in an image may be guaranteed. Since pixel mapping may be effectively changed using a calibration parameter, example embodiments may be used for easily correcting an error occurring due to a process and an assembly without quality deteriorating.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device comprising:
a panel comprising a plurality of pixels; and
an optical layer configured to generate a light field using a plurality of optical elements,
wherein the optical layer is arranged with respect to the panel to eliminate a repetition periodicity between the plurality of pixels and the plurality of optical elements.

2. The display device of claim 1, wherein an optical parameter associated with the optical elements comprises a slanted angle between a first line corresponding to the optical elements and a second line corresponding to the pixels, a pitch between the optical elements, an offset location between the panel and the optical layer, a gap between the panel and the optical layer, or a combination selected from the slanted angle, the pitch, the offset location, and the gap.

3. The display device of claim 2, wherein the slanted angle is based on a number of first pixels corresponding to a direction of a first axis in the panel in comparison to a number of second pixels corresponding to a direction of a second axis in the panel, and
the direction of the first axis and the direction of the second axis are orthogonal, and the number of the first pixels comprises a number with a decimal when the number of the second pixels is a positive integer.

4. The display device of claim 2, wherein the pitch is based on a number of third pixels matched to a single one of the optical elements, and
the number of the third pixels comprises a number with a decimal.

5. The display device of claim 2, wherein the slanted angle is based on a line that connects a first point at a top of the panel to a second point at a bottom of the panel.

6. The display device of claim 2, wherein the slanted angle is within an angle range of which an artifact is minimized.

7. The display device of claim 1, wherein the processor is configured to generate the image based on a direction of a ray propagating according to the location relationship.

8. The display device of claim 1, wherein the processor is configured to generate the image based on whether a direction of a ray propagating according to the location relationship is toward a viewpoint from among a plurality of viewpoints, the plurality of viewpoints being divided in a viewing range.

9. The display device of claim 1, wherein the processor is configured to,
determine a viewpoint image corresponding to a direction of a ray based on the location relationship, the viewpoint image comprising a number with a decimal, and
generate the image based on a plurality of viewpoint images and the viewpoint image.

10. The display device of claim 1, wherein the processor is configured to obtain a calibration parameter and generate information associated with the location relationship based on the calibration parameter.

11. A display method comprising,
obtaining information associated with a location relationship between a plurality of pixels in a panel and a plurality of optical elements in an optical layer, the location relationship being based on an optical parameter of the optical layer; and
generating an image of the panel based on the information,
wherein the optical layer is arranged with respect to the panel to eliminate a repetition periodicity between the plurality of pixels and the plurality of optical elements.

12. The display method of claim 11, wherein the optical parameter comprises a slanted angle between a first line corresponding to the optical elements and a second line corresponding to the pixels, a pitch between the optical elements, an offset location between the panel and the optical layer, a gap between the panel and the optical layer, or a combination selected from the slanted angle, the pitch, the offset location, and the gap.

13. The display method of claim 12, wherein the slanted angle is based on a number of first pixels corresponding to a direction of a first axis in comparison to a number of second pixels corresponding to a direction of a second axis in the panel, and
the direction of the first axis and the direction of the second axis are orthogonal, and the number of the first pixels comprises a number with a decimal when the number of the second pixels is a positive integer.

14. The display method of claim 12, wherein the pitch is based on a number of third pixels matched to a single one of the optical elements, and
the number of the third pixels comprises a number with a decimal.

15. The display method of claim 12, wherein the slanted angle is within an angle range of which an artifact is minimized.

16. The display method of claim 11, wherein the generating generates the image based on a direction of a ray propagating according to the location relationship.

17. The display method of claim 11, wherein the generating comprises,
determining whether a direction of a ray propagating according to the location relationship is toward a viewpoint from among a plurality of viewpoints, the plurality of viewpoints being divided in a viewing range; and
generating the image based on a result of the determining.

18. The display method of claim 11, wherein the generating comprises,
determining a viewpoint image corresponding to a direction of a ray based on the location relationship, the viewpoint image comprising a number with a decimal; and
generating the image based on a plurality of viewpoint images and the viewpoint image.

19. The display method of claim 11, wherein the obtaining comprises,
obtaining a calibration parameter; and
generating information associated with the location relationship based on the calibration parameter.

20. A non-transitory computer-readable medium including computer readable instructions, which when executed by a processor, cause the processor to implement the method of claim 11.

* * * * *